June 5, 1923.
G. A. LYON
AUTOMOBILE BUFFER ATTACHER
Filed Sept. 30, 1921
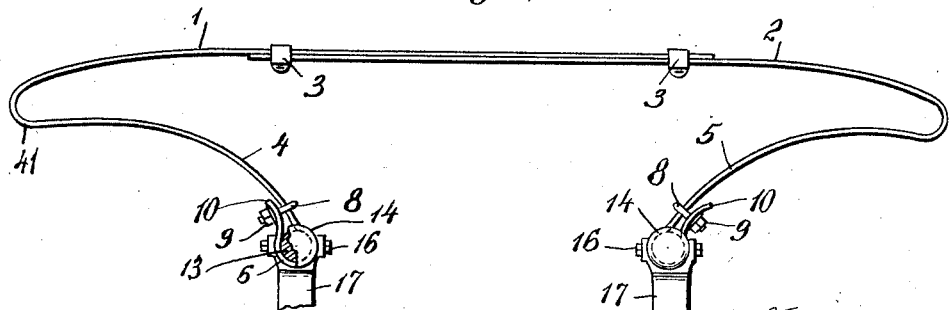
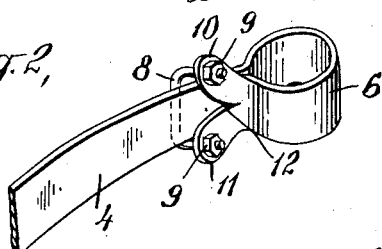
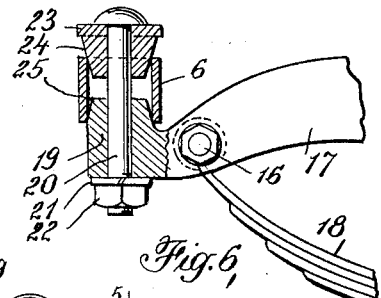
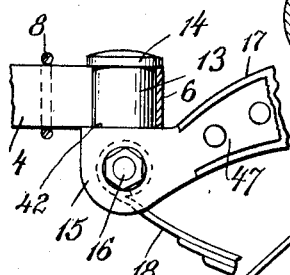
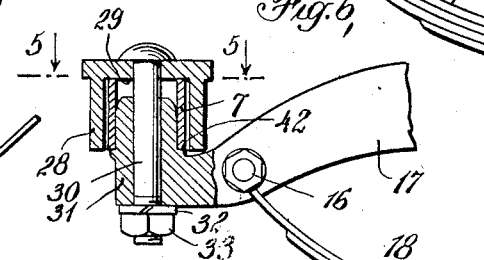
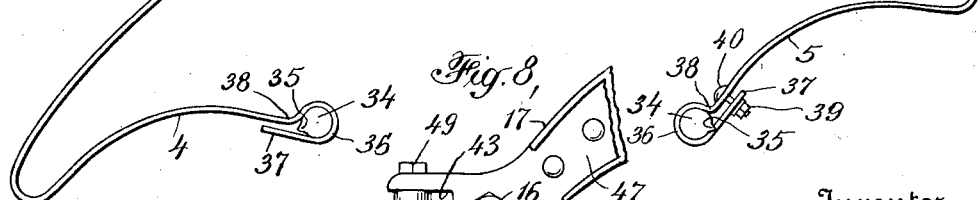
Inventor
George Albert Lyon
By his Attorney
Harry L. Duncan Patented June 5, 1923.

1,457,533

UNITED STATES PATENT OFFICE.

GEORGE ALBERT LYON, OF PHILADELPHIA, PENNSYLVANIA.

AUTOMOBILE BUFFER ATTACHER.

Application filed September 30, 1921. Serial No. 504,396.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffer Attachers, of which the following is a specification, taken in connection with accompanying drawing.

This invention relates to devices for attaching automobile buffers or bumpers and comprises attaching loops or other suitable portions which may be formed on the spring strip or other attaching members of the buffer so that these attaching portions may be clamped around or bolted or otherwise secured within sockets formed in the co-operating frame end supports or other portions of the vehicle such for instance, as a vertical or other head or supporting bracket portion which may be formed on the frame end which is riveted or otherwise secured to the end of the frame member of the automobile. Such an attaching loop arrangement is especially useful in connection with the resilient or spring strip buffers of the general Lyon type since, where these buffers have resilient end loops, collision impact not only bends the yielding bumper front, but also tends to bend or distort the connected rearwardly extending attaching members which sometimes crack or break where they are rigidly secured to the automobile frame; but with this attaching loop and co-operating frame end support or head the loop can move or slide around the head somewhat under collision conditions so as to relieve excessive or destructive strains. For this purpose the frame end support or head may in some cases be advantageously arranged adjacent or substantially above the usual spring bolt on the frame end and various retaining projections or clamping devices may be formed or used in connection with the head to keep the attaching loops in proper co-operation therewith. The attaching loop is preferably substantially clamped or gripped around the frame end support, and the spring steel strip or other end of the loop material may advantageously be arranged adjacent the attaching member and engaged by U-bolt or other fastening devices to bring these parts together and contract or close the attaching loop around the head.

In the accompanying drawing showing in a somewhat diagrammatic way various illustrative embodiments of this invention.

Fig. 1 is a plan view showing one form of trative embodiments of this invention, Fig. 2 is an enlarged perspective view showing one of the attaching loops thereof.

Fig. 3 is a vertical sectional view showing the loop on the frame end support.

Fig. 4 is a similar sectional view showing another frame end construction.

Fig. 5 is a horizontal section showing another arrangement taken along the line 5—5 of Fig. 6.

Fig. 6 is a vertical section thereof.

Fig. 7 is a plan view showing the assembly or attachment of another form of the device; and Fig. 8 is a vertical sectional view of still another construction.

The automobile or other vehicle buffer or bumper may be of any desired form and construction, preferably comprising resilient strip attaching members such as 4, 5, as shown in Fig. 1. The buffer is preferably of the general Lyon spring strip type and the attaching member 4 is illustrated as integral with the end loop 41, and the impact receiving or front member 1. The other strip of tempered spring steel, of which the buffer may be composed, comprises the front member 2 overlapping and reenforcing the member 1 throughout the central part of the buffer and preferably adjustably secured thereto by the connecting devices or clips 3. This strip 2 has a similar integral end loop and attaching member 5 and these attaching members may have their ends formed in any suitable way to cooperate with frame end supports and they may be bent around to produce gripping attaching loops. As indicated in Figs. 1 and 2, the strip 4 may be bent adjacent its end to form the attaching member 6, and the strip end may be split or bifurcated as at 12 to form the vertically separated ends 10, 11 in which holes or apertures may be formed to accommodate the ends of the U-bolt or other fastening devices 8. When the nuts 9 are screwed on the threaded ends of the U-bolt the attaching loop is contracted or closed to a corresponding extent so as to more tightly engage or grip the frame end or other support with which it cooperates, and it is usually desirable to bend the ends of the attaching members outward and to have the strip end at least approximately in line with the adjacent part of the attaching member such as 4, which forms from this part of the attaching member a correspondingly greater part of the loop which engages the front of the end support so as to give a somewhat stronger connection therewith. This also gives a firmer and more secure attachment which minimizes shaking and rattling under running conditions of the vehicle and under collision conditions the attaching member can swing or slide about the end support with less danger of injury or breakage.

The frame end support may be given any suitable form and construction to cooperate with the end of the attaching member and it is desirable to combine the frame end support, with which the attaching loop cooperates, with the spring bolt or other spring connecting devices usually formed on the frame ends which are riveted or otherwise securely connected to the goose necks or front ends of the frame members of the automobile, although this type of frame end supports may sometimes be used on the rear portions or ends of the frame members. As is shown in Fig. 3, the frame end member 15 which may be formed with a hole for the usual spring bolt 16 to support the end of the vehicle spring 18 may have an integral securing portion 47 of such size and shape as to fit into the end of the front goose-neck 17 of the channel iron side frame and be permanently and securely connected therewith as by the rivets indicated. This supporting member may be formed with a frame end support for the attaching loop in the form of a substantially vertical cylindrical head 13, having the horizontal surface 42 below and having, if desired, adjacent the top of the head one or more suitable retaining projections such as the collar 14, arranged fairly close to the upper edge of the attaching loop so as to prevent its working up on the head after it has been put in place thereon. Of course in assembling the buffer the attaching loops are allowed to spring open or are forced open by forcing outward the strip end 10 so that each loop may pass down around its frame end support over the collar or retaining projection thereon the radial width of which need not always be as great as is indicated diagrammatically in Fig. 3. Then the attaching loops may be contracted by tightening up the U-bolt or other fastening devices so that the loops securely and grippingly engage these heads or supports, the resilient character of the strip ends being desirable in this connection because this tends to keep the loops tight around the heads so as to prevent rattling under running conditions.

Fig. 4 shows another illustrative arrangement in which the frame end support or vertical head is arranged adjacent but slightly ahead of the spring bolt 16. If desired the upper end or portion of the support 19 may be given a substantial wedging or conical form as at 25 so as to wedgingly engage and clamp the attaching loop 6; and if desired also, a cooperating wedging cap 24 may be forced down inside the loop as by the clamping securing bolt 20 which may have the lock washer 21 arranged next to its nut 22. By tightening this bolt the two wedging members securely engage the upper and lower portions of the attaching loop so as to quickly ensure tight engagement therewith and since the taper or angle of these portions is considerably exaggerated in Fig. 4 the upper wedging member or cap 24 may, if desired, be forced home so as to ensure tight or substantial engagement of the loop with the collar or projecting portion 23 on the cap.

Figs. 5 and 6 show another illustrative arrangement in which the attaching loop 7, which may be formed on the end of the attaching member 4, may have its strip end 27 brought around adjacent the strip 4 without in all cases being clamped or secured thereto as described in connection with Fig. 2. In this instance the frame end support may comprise the substantially cylindrical head 31 having, if desired, a somewhat reduced upper end over which the resilient end loop 7 may be forced; and this may be conveniently accomplished by a suitable clamping cap 29, forced downward around the loop and head as by the bolt 30 and cooperating tightening devices 32, 33. The clamping cap may have a slotted depending portion 28 substantially engaging the outside of the loop and the edges 42 of the slot through which the loop ends project may engage them sufficiently to prevent outward movement or may even wedge or hold them together tightly against the frame end support 31 if desired. In this way a more simple construction is thus secured which gives considerable strength and rigidity, especially when the horizontal face or flange 42 on the supporting end is extended substantially around beneath the loop which may be forced against it by the cap.

Another arrangement, shown in Fig. 7, may comprise special retaining lugs or projections 35 formed on the upper portion or top of the frame end supports 34. These are preferably so positioned that the loop 36 may be slipped down over these projections on the head when the buffer front portion 1 is swung out into some such angular position as is indicated on the left of Fig. 7; and then when the front strip is swung around into transverse operative position the slot moves out of line with this retaining projection which then definitely and securely holds down the attaching loop as is indicated at the right of Fig. 7. Of course the strip end 37 may be formed with one or more holes or apertures through which the bolts 40 may extend so that these fastening devices contract the attaching loops when the nuts 39 are screwed home to ensure the desired gripping engagement between the attaching loops and frame end supports. In this case the strip ends 37 are substantially tangent to the adjacent portion of the end loop so that from about the point 38 the main portion of this attaching member which constitutes the front part of the attaching loop forms a socket in engagement with the frame end support so as to effectively take any collision strains that may occur.

Fig. 8 shows another arrangement of frame end support in which the substantially vertical cylindrical or other head 44 may be securely supported between or may be integral with the upper and lower portions 45 of the frame end member 46; so that where the attaching loops are not sufficiently open they may be forced or wedged out to such extent as to be passed around this head 44, the strip end passing through the slot or opening 43 in this case. It is sometimes desirable, however, to have the head 44 removably secured to the supporting member 46 in this type of construction and for this purpose the head 44 which may be cylindrical or, preferably, slightly tapering on its outer surface, may have a vertical hole therethrough, so that by removing the bolt and nut 49, the head may be removed from the frame end member 46 and forced into, or clamped within the attaching member. Then the head may be bolted or fastened in place to securely or tightly hold the attaching loop in position without substantial or undesirable vibration under running conditions, while this bolted or rotary connection of the head with the frame end may allow a still more easy angular movement of the parts under collision conditions.

This invention has been described in connection with a number of embodiments, forms, proportions, parts, arrangements, materials, methods of manufacture, connection and use, to the details of which disclosure the invention is not of course to be limited, since what is claimed as new and what is desired be secured by Letters Patent is set forth in the appended claims.

I claim:

1. The automobile buffer comprising a spring strip buffer front portion and integral end loops and attaching members each having its end bent to form a nearly closed gripping attaching loop, fastening devices to contract said attaching loops, frame ends rigidly and permanently secured to the ends of the vehicle frame members and having a vertical frame end support formed with a cylindrical head to be engaged and yieldingly gripped by one of said attaching loops and formed with a retaining projection adjacent the top of said head.

2. The automobile buffer comprising a spring strip buffer front portion and end loops and spring strip attaching members each having its end bent to form a nearly closed gripping attaching loop, fastening devices to contract said attaching loops, frame ends rigidly and permanently secured to the ends of the vehicle frame members and having a vertical frame end support to be engaged and yieldingly gripped by one of said attaching loops.

3. The automobile buffer comprising a resilient buffer front portion and spring strip end loops and integral attaching members, the end of each of said attaching members being bifurcated and bent outwardly to form a nearly closed gripping attaching loop, U-bolt fastening devices to contract said attaching loops, frame ends rigidly and permanently secured by rivets to the ends of the vehicle frame members and having spring bolt connections and a vertical frame end support substantially above the spring bolt and formed with a cylindrical head to be engaged and yieldingly gripped by one of said attaching loops and formed with an integral projecting collar adjacent the top of said head.

4. The automobile buffer comprising a resilient buffer front portion and spring strip attaching members, the end of each of said attaching members being bent outwardly to form a nearly closed gripping attaching loop, fastening devices to contract said attaching loops, frame ends rigidly and permanently secured to the ends of the vehicle frame members and having spring bolt connections and a vertical frame end support formed with a cylindrical head to be engaged and yieldingly gripped by one of said attaching loops and formed with a projection adjacent the top of said head.

5. The automobile buffer comprising buffer front portion and connected spring strip attaching members each having its end bent to form a nearly closed gripping attaching loop, fastening devices to contract said attaching loops, frame ends rigidly and permanently secured to the ends of the vehicle frame members and having a vertical frame end support adjacent the spring bolt and formed with a head to be engaged and yieldingly gripped by one of said attaching loops.

6. The automobile buffer comprising a buffer front portion and connected attaching members each having a gripping attaching loop, frame ends rigidly secured to the ends of the vehicle frame members and having a frame end support formed with a head to be engaged by one of said attaching loops.

7. The automobile buffer formed of resilient spring strip and comprising a resilient buffer front portion, end loops and integral attaching members the end of each of said attaching members being bifurcated and bent outwardly to form a nearly closed gripping attaching loop, and U-bolt fastening devices to contract said attaching loops so that they are adapted to yieldingly grip vertical frame end supports secured to the ends of the vehicle frame members adjacent the spring bolts.

8. The automobile buffer formed of resilient spring strip and comprising a resilient buffer front portion and integral attaching members, the end of each of said attaching members being bent to form a nearly closed gripping attaching loop, and fastening devices to contract said attaching loops so that they are adapted to yieldingly grip vertical frame end supports secured to the ends of the vehicle frame members adjacent the spring bolts.

9. The automobile buffer having resilient spring strip members and comprising a buffer front portion and resilient loops and integral attaching members, the end of each of said attaching members being bent outwardly to form a nearly closed gripping attaching loop, and fastening devices to contract said attaching loops so that they are adapted to grip frame end supports secured to the ends of the vehicle frame members adjacent the spring bolts.

10. The automobile buffer having resilient spring strip members and comprising a buffer front portion and resilient attaching members the end of each of said attaching members being bent to form a gripping attaching loop, and fastening devices to contract said attaching loops so that they are adapted to grip frame end supports.

11. The automobile buffer comprising a buffer front portion and flat strip attaching members the laterally separated ends of said attaching members being bent to form gripping attaching loops, and fastening devices to contract said attaching loops so that they are adapted to grip laterally separate vertical frame end supports secured to the vehicle.

12. The automobile buffer comprising a buffer front portion and flat strip attaching members the separated ends of said attaching members having gripping attaching loops so that they are adapted to grip separated vertical frame end supports secured to the vehicle.

13. The automobile buffer attaching devices comprising frame ends adapted to be rigidly and permanently secured by rivets to the ends of the automobile frame members and each having a spring bolt connection and an integral vertical frame end support substantially above the spring bolt and formed with a cylindrical head adapted to be gripped by one of the attaching loops of the buffer and formed with an integral projecting collar adjacent the top of said head.

14. The automobile buffer attaching devices comprising frame ends adapted to be rigidly and permanently secured to the ends of the automobile frame members and each having a spring bolt connection and an integral vertical frame end support substantially above the spring bolt and formed with a head adapted to be gripped by one of the attaching loops of the buffer.

15. The automobile buffer attaching devices comprising frame ends adapted to be rigidly and permanently secured to the ends of the automobile frame members and each having a spring connection and a frame end support adjacent the spring connection and formed with a head adapted to be engaged or gripped by one of the looped attaching members of the buffer and formed with an upper projecting retaining device.

16. The automobile buffer attaching devices comprising frame ends secured to the automobile frame members and each having a spring connection and a frame end support adjacent the spring connection and formed with a substantially vertical head adapted to be embraced by one of the attaching members of the buffer.

17. The automobile buffer attaching devices comprising frame ends each having a securing portion rigidly and permanently secured to the ends of the automobile frame members and having an integral frame end support adapted to be substantially encircled by and rigidly connected to one of the attaching members of the buffer.

18. The automobile buffer attaching devices comprising frame ends each having a securing portion rigidly secured to the ends of the automobile frame members and having a cylindrical head adapted to be rigidly connected to one of the attaching members of the buffer.

GEORGE ALBERT LYON.